United States Patent [19]

Eaton et al.

[11] Patent Number: 5,358,286
[45] Date of Patent: Oct. 25, 1994

[54] COMPLETELY FABRICATED PIPE SLEEVE ASSEMBLY

[75] Inventors: Delbert H. Eaton, Buckley; Mark W. Kirchner, Seattle, both of Wash.

[73] Assignee: Romac Industries, Inc., Seattle, Wash.

[21] Appl. No.: 159,860

[22] Filed: Nov. 30, 1993

[51] Int. Cl.$^5$ .............................................. F16L 41/00
[52] U.S. Cl. .................................. 285/197; 285/373; 285/419
[58] Field of Search ................ 285/197, 373, 419, 417

[56] References Cited

U.S. PATENT DOCUMENTS

| | | | |
|---|---|---|---|
| 3,189,970 | 6/1965 | Barr | 24/284 |
| 3,204,665 | 9/1965 | Faint | 285/373 X |
| 3,558,162 | 1/1971 | Ferrai et al. | 285/197 X |
| 3,792,879 | 2/1974 | Dunmire et al. | 285/197 |
| 4,630,647 | 12/1986 | Thompson | 285/417 X |
| 4,708,373 | 11/1987 | Morris, Jr. | 285/197 X |
| 4,789,189 | 12/1988 | Robertson | 285/373 |
| 5,040,828 | 8/1991 | Kane | 285/197 |

FOREIGN PATENT DOCUMENTS

| | | | |
|---|---|---|---|
| 0625461 | 8/1961 | Canada | 285/197 |
| 1003871 | 1/1977 | Canada | 285/197 |

Primary Examiner—Randolph A. Reese
Assistant Examiner—Heather Chun Shackelford
Attorney, Agent, or Firm—Roy E. Mattern, Jr.

[57] ABSTRACT

By using fabrication procedures, and not using any casting procedures, a pipe sleeve assembly per se, or with additional components, is made for installation on a pipeline. When this pipe sleeve assembly is fully tightened about a plastic pipe, there is acceptable limited radial deflection of cross-sectional portions of the plastic pipe, being sealed by a surrounding gasket held in place by assembled fabricated parts and bolt and nut fasteners of this pipe sleeve assembly. On opposite sides of each separating gap of the pipe sleeve, side bar and lug units are welded to the pipe sleeve. Between opposite lugs, independently removable bolt and nut fasteners are secured. In one embodiment, opposite lugs both have holes, which are aligned to receive and to hold portions of a bolt. In another embodiment, one of the opposite lugs has a hole, and the other opposite lug has spaced portions thereof, each having an overlapping lip portion, which receive a drop in bolt portion located near the head of the bolt. The bolt is then moved, so the bolt head is located under the overhanging lip portions, and another bolt portion is arranged within the hole of the opposite lug. Upon tightening of the respective nuts, the respective independently removable bolt and nut fasteners are secured in place holding the sleeve sections together. These embodiments are fabricated from stainless steel, mild steel and bronze. While fasteners are kept clear, other fabricated parts have surfaces treated by: impacting blasting particles, chemicals and/or coatings.

16 Claims, 2 Drawing Sheets

U.S. Patent    Oct. 25, 1994    Sheet 1 of 2    5,358,286
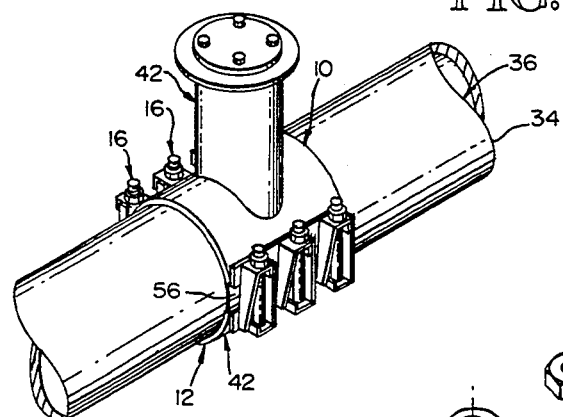
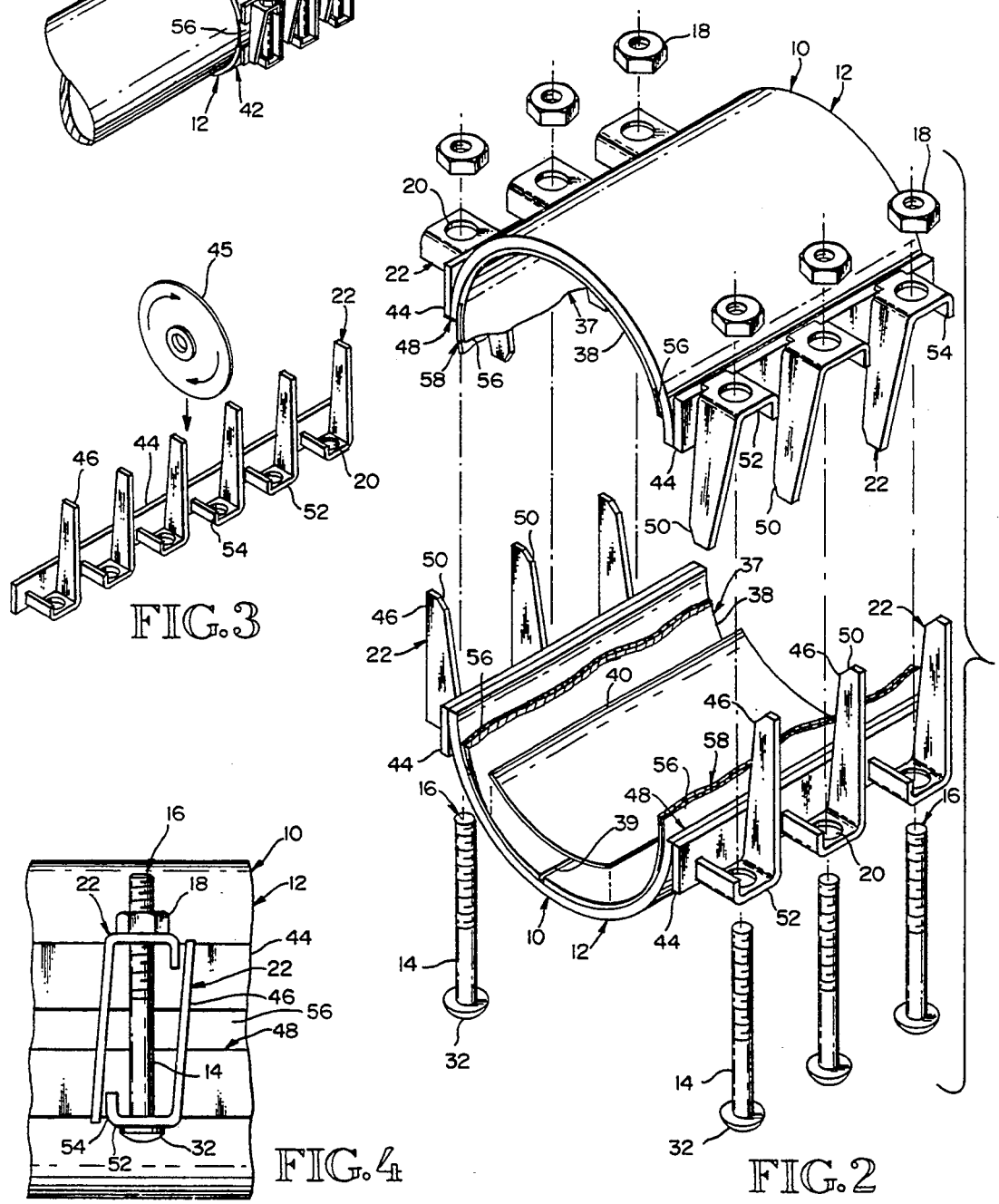

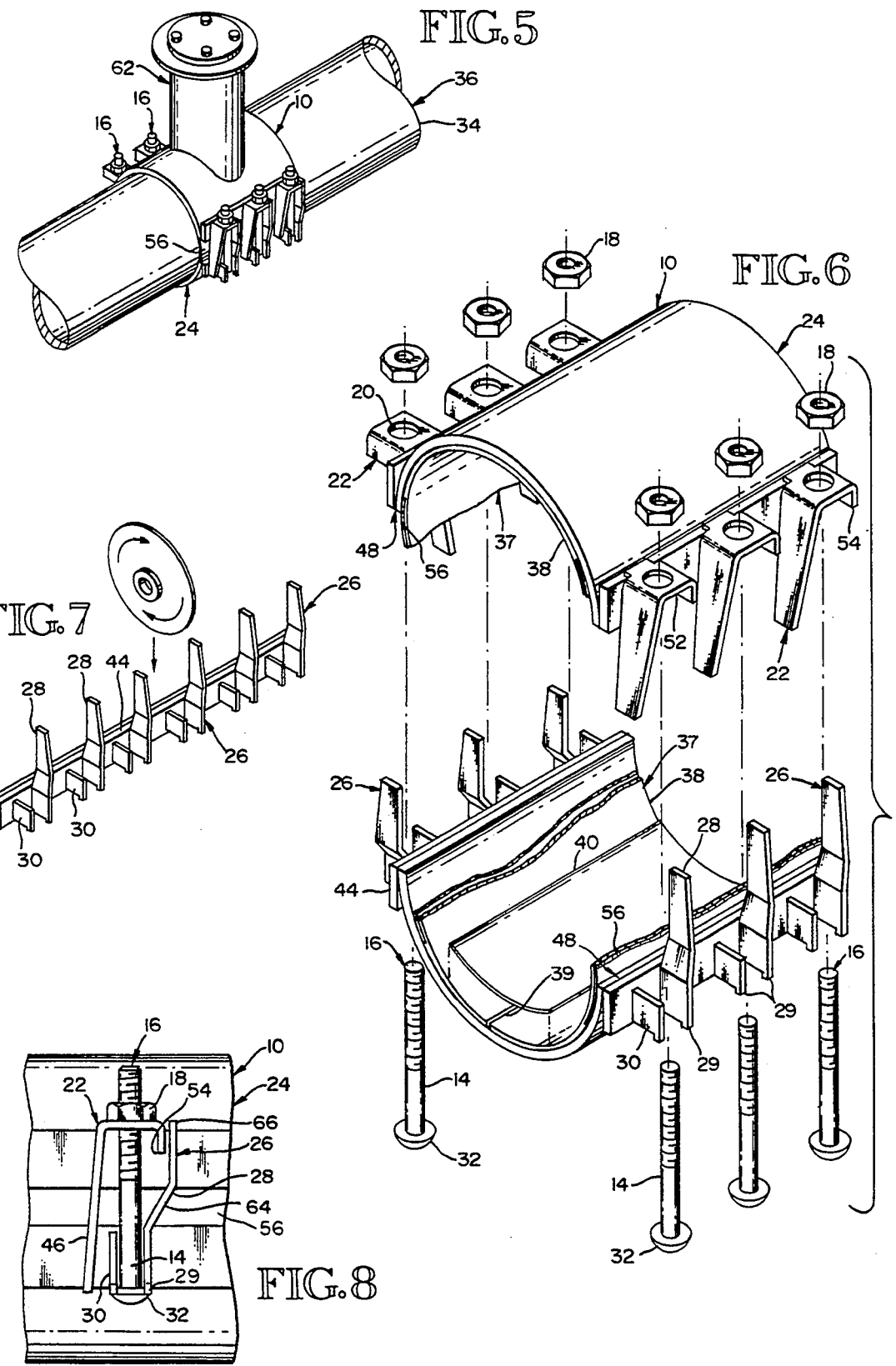

COMPLETELY FABRICATED PIPE SLEEVE ASSEMBLY

BACKGROUND

With respect to pipe sleeves secured about portions of a pipeline, when the pipeline is made of plastic pipe, any distortion of the cross-sectional area portions of the plastic pipe should preferably be avoided or held to a minimum allowable distortion. Most pipe sleeve assemblies when made of cast components in a way to avoid or to limit plastic pipe distortion, become quite expensive. Also some fabricated pipe sleeve assemblies, not having transversely extending lug portions, when tightened, cause unwanted distortion of plastic pipes. Such sleeves which are effective with respect to sealing about metal pipe, but are less effective with respect to sealing about a larger plastic pipe, are illustrated, for example, in U.S. Pat. Nos. 4,708,373, and 5,040,828.

Transversely extending lug portions are illustrated in U.S. Pat. No. 3,189,970. They are shown in respect to an all stainless steel repair clamp.

There continues to be a need to have lower cost pipe sleeves, which upon tightening keep the overall shell gasket in an excellent sealing position, while either not distorting a plastic pipe or only creating a limited distortion of a plastic pipe, thereby either not stressing nor overstressing a plastic pipe.

SUMMARY

With respect to tightening a pipe sleeve assembly with its shell gasket, especially around plastic pipes, no distortion or very limited distortion of the cross-sectional shape of the plastic pipe occurs. To effectively reach this very limited or no distortion objective, comparatively overall lower cost pipe sleeves are made, for example, by fabricating parts thereof out of mild steel, which after their assembly by welding, have their respective surfaces treated by: impacting blasting particles; chemical treatments, such as passivation; and/or coated as required, for example, with epoxy resin. These treatments of the sleeve are undertaken independently of the bolts and nuts. Therefore the bolts and nuts may be derived from various materials, and the other sleeve components may be derived from various materials.

To insure that bolt and nut assemblies are not in the way, for example, during the surface treatments, such as during a particle blasting operation of mild steel components, independently removable bolt and nut fasteners are used in all the pipe sleeve assemblies. The bolts thereof are located by passing through aligned holes of oppositely positioned lugs, which are spaced and welded on opposite side bar parts. These side bar parts are secured by welding to a sleeve adjacent a separating gap thereof. Or the bolts thereof are located, by having a bolt portion near the bolt head dropped into a close fit between spaced pieces of a lug welded to a side bar. The bolt is then moved, so the bolt head is located under overhanging lip portions of the lug. During these motions, the bolt has another bolt portion positioned within a hole of an opposite lug, welded on an oppositely positioned side bar, in turn welded to the sleeve adjacent the separating gap thereof.

A leg portion of each lug extends transversely across a slit of the sleeve to be guided and positioned on the opposite side bar. Some lugs have an integral longitudinal portion extending at right angles to the transverse extended leg portion and extending along the side bar, to provide a portion through which a hole is made to receive a portion of a bolt. Other lugs have spaced pieces to closely hold a portion of a bolt adjacent the head thereof, after portions of the bolt head are positioned into place below respective overhanging lip portions of these two spaced pieces of this lug.

Upon the tightening of the independently removable bolt and nut fasteners, the pipe sleeve assembly with its shell gasket is firmly secured about the pipeline in its sealed position. During this tightening, because of the design of this welded together fabricated pipe sleeve assembly, having the welded side bars, on which the spaced lugs are welded, and through the effective utilization of the aligning and slidable positions of the transversely extending leg portions of these respective spaced lugs, any distortion of the pipeline is eliminated or is kept very limited, with respect to the possible distortion of the cross-sectional shape of a pipeline made of plastic pipe.

DRAWINGS OF THE PREFERRED EMBODIMENT

The completely fabricated pipe sleeve assembly is illustrated in the drawings in two embodiments, wherein:

FIG. 1 is a perspective view of one locale where the fabricated pipe sleeve assembly is installed in a main pipeline at the start of a branch pipeline, and the independently removable bolt and nut fasteners of this assembly, are positioned, as each bolt has portions thereof located inside holes of oppositely located lugs;

FIG. 2 is a perspective exploded view, with some shell gasket portions removed, of a basic fabricated pipe sleeve assembly useful as a pipe repair sleeve, and if manufactured using additional production steps and components, becoming useful, for example, as shown in FIG. 1, where a branch pipeline is started along a main pipeline;

FIG. 3 is a perspective view showing how an extended side bar of the pipe sleeve assembly of FIGS. 1 and 2, has spaced lugs welded to it, and then, depending on how long a subsequent specified length of a side bar and a group of spaced lugs welded thereon, is determined to be, the extended side bar is cut in selected locations, or side bars are made to exact lengths;

FIG. 4, is a partial view, with portions broken away, to show how alike lugs shown in FIGS. 1, 2, and 3, are positioned opposite one another on side bars, which are positioned opposite one another, and the aligned holes of these alike lugs receive portions of the bolt, which is secured in place upon tightening the nut of the independently removable bolt and nut fastener;

FIG. 5 is a perspective view, of one locale where the fabricated pipe sleeve assembly is installed in a main pipeline at the start of a branch pipeline, and the independently removable bolt and nut fasteners of this assembly are positioned, as each bolt has a portion thereof near the head thereof dropped into a close fit between pieces of a respective lug, and the bolt head is positioned below overhanging lips of respective pieces of a respective lug, and another portion of the bolt is located inside a hole of an oppositely located lug;

FIG. 6 is a perspective exploded view with some shell gasket portions removed, of a basic fabricated pipe sleeve assembly useful as a pipe repair sleeve, and if manufactured using additional production steps and components, becoming useful, for example, as shown in FIG. 5, where a branch pipeline is started along a main pipeline;

FIG. 7 is a perspective view, like FIG. 3, showing how an extended side bar of the pipe sleeve assembly of FIGS. 5 and 6, has spaced lugs welded to it, to frictionally hold a portion of a bolt, and then depending on how long a subsequent specified length of a side bar and a group of spaced lugs is determined to be, the extended side bar is cut in selected locations, or the side bars are made to exact lengths; and FIG. 8 is a partial view, with portions broken away, to show how opposite unlike lugs are positioned opposite one another on respective side bars, and a bolt near the head thereof has a portion thereof dropped into place in one lug to be closely held, and the bolt head is positioned below overhanging lips of respective pieces of a respective lug, and also a portion thereof of this bolt, is received in the hole of the opposite lug. Then the bolt is secured in place upon tightening of the nut of the independently removable bolt and nut fasteners.

DESCRIPTION OF THE PREFERRED EMBODIMENTS

The Two Illustrated Embodiments

The completely fabricated pipe sleeve assembly 10, is illustrated in two embodiments in the drawings. In the embodiment 12, shown in FIGS. 1 through 4, the bolts 14 of the independently removable bolt and nut fasteners 16, having the nuts 18, are positioned by being passed through holes 20 of opposing lugs 22. In the embodiment 24, shown in FIGS. 5 through 8, bolts 14 of the independently removable bolt and nut fasteners 16, having the nuts 18, are positioned by being dropped into a close fitting place in one lug 26 having two parallel spaced pieces, one longer 28, and one shorter 30, each having an overhanging lip 29 to overhang the respective bolt heads 32, and by passing through, in part, a hole 20 of an opposing lug 22.

Both embodiments 12 and 24 are used with metal pipe and especially with plastic pipe 34 of a pipeline 36. Plastic pipe, either is not distorted, or distorted within a limited acceptable range of distortion, when the bolt and nut fasteners 16 are tightened, and the shell gasket 37 effectively creates the seal about the pipe 34.

The Embodiment Wherein the Bolt Passes in Part Through Respective Holes of Oppositely Positioned Lugs on Their Respective Side Bars In FIG. 1, a completely fabricated pipe sleeve 10 is illustrated, which has been fabricated beyond serving as a repair sleeve to serve instead as branch line sleeve 42. The starting components, however, for all embodiments, first comprise those components needed for making a repair sleeve. These starting components for this embodiment 12 are shown in FIG. 2, where the optional number of bolt and nut fasteners 16, with corresponding lugs 22, are six bolt and nut fasteners 16, and twelve lugs 22.

As illustrated in FIG. 3, long side bars 44 are preferably manufactured with spaced lugs 22 welded to it, and later they are cut with a saw 45 to specified lengths, such as the length on which three lugs are spaced, as illustrated in FIG. 2. Also side bars 44 are made to exact lengths. Each lug 22, as used in this embodiment 12 of the completely fabricated pipe sleeve 10, has a hole 20 to receive a portion of a bolt 14. Also each lug 22 has an integral transverse extended portion 46 to extend across the separating gap locale 48 of the completely fabricated pipe sleeve 10. This integral transverse extended portion 46 has a guiding surface structure 50 which is useful during assembly of the sleeve 10. In addition, each lug 22 has an integral longitudinal portion 52 extending at near right angles to the transverse extended portion 46, and extending along the side bar 44 to provide the portion having the hole 20, which positions a portion of the bolt 14. Preferably, when more strength is required, the integral longitudinal portion 52 continues on beyond the portion having the hole 20 to receive the portion of the bolt 14, and then has an integral transverse extended portion 54, extending partially over the side bar 44 to which it is welded.

Upon assembly of this embodiment 12, of this completely fabricated pipe sleeve 10, the positioning of side bars 44 with their respective like lugs 22 is maintained upon the securement of the bolt 14 and nut 18 fasteners 16, as illustrated in FIGS. 1 and 4. These bolt and nut fasteners 16 during the manufacturing process are kept clear of this embodiment 12. In this way, for example, when all the other parts are manufactured from mild steel, then the mild steel surfaces are cleaned by using impacting blasting particles, without being concerned about damaging bolt and nut fasteners 16. Then, after such cleaning, these mild steel surfaces are covered by an epoxy resin coating.

Other surface cleaning processes are undertaken, such as chemical treatments referred to, for example, as passivation treatments. Thereafter, a selected coating is applied as specified. All these treatments of the surfaces of the sleeve are undertaken independently of the presence of bolts and nuts, which are completely removable at all times. Therefore, the bolts, nuts, and sleeve materials, may be derived from various materials and still be assembled into a completely fabricated pipe sleeve assembly 10.

The shell gasket 37 is not shown in its entirety. In the illustrated embodiment two portions of it, a larger portion 38 and a smaller portion 40, are arranged about a pipe 34, and they are overlapped, via their respective tapering portions, to complete the circumferential sealing. The use of the smaller portion 40 of the gasket prevents any leakage that would otherwise occur through the opening or slit 39, which remains between the ends of the larger portion 38 of the gasket 37. The larger portion shell gasket 38 includes at least two metal shields 56, which upon assembly are positioned at separation gap locales 48, to complete an entire surrounding metal shell configuration 58 about the shell gasket 37. These metal shields 56, also referred to as armors, preferably are made of heavy gauge stainless steel. They are bonded to the larger portion shell gasket 38 by a vulcanization process.

The Differences in Respect to the Embodiment Wherein the Bolt is Dropped Into Place and Held Near the Head Thereof in One Lug and Then a Portion Thereof is Positioned in a Hole of an Oppositely Positioned Lug In FIG. 5, another embodiment 24 of the completely fabricated pipe sleeve 10 is illustrated, which also has been fabricated beyond serving as a repair sleeve, to serve instead as a branch line sleeve 62. The starting components, however, for all embodiments, first comprise those components needed for making a repair sleeve. These starting components for this embodiment 24 are shown in FIG. 6, where the optional number of bolt 14 and nut 18 fasteners 16, with corresponding lugs 22 and 26, are six bolt and nut fasteners, and six lugs 22 and six lugs 26.

As illustrated in FIGS. 3 and 7, the lugs 22 and 26 are welded to long side bars 44 during a manufacturing period. Then later they are cut with a saw 45 to specified lengths, such as the length on which three lugs are welded at spaced locations, as illustrated in FIG. 6. Also the side bars are made to exact lengths.

The lug 22 is made in the same way as described in reference to the embodiment 12, having a hole 20 to receive a portion of a bolt 14. The lug 26 is made differently to receive a bolt 14 in respect to a portion thereof located near the head 32 of the bolt 14. Two pieces of lug 26 are spaced apart to receive the bolt 14, which is dropped into place, and the bolt head 32 is positioned under respective overhanging lips 29 on the respective two pieces of the lug 26. One piece 28 of lug 26 is longer and is welded to a side bar 44. It extends transversely to extend across the separating gap locale 48 and over the oppositely located side bar 44. The other piece 30 is shorter and remains over the side bar 44, on which both the pieces 28 and 30 are welded. They are arranged in a parallel spaced configuration to receive a portion of the bolt 14, and thereafter closely hold the bolt 14 in place, in conjunction with the overhanging lip 29.

As shown in FIG. 8, the lug 26 in respect to the longer piece 28 has a bent portion 64, which is so positioned that end 66 of this longer piece 28 overlappingly clears the extended transverse portion 54 of the opposing lug 22, which has the hole 20, in which a portion of the bolt 14 is positioned, upon the assembly shown in this FIG. 8.

All the other parts illustrated in FIGS. 5 through 8, are like those other parts illustrated in FIGS. 1 through 4. Therefore, the principal difference between these embodiments centers on how the bolt and nut fasteners will be installed.

Other Embodiments

Other embodiments include a completely fabricated pipe sleeve having only one separation gap locale 48, instead of the two separation gap locales 48, as illustrated in the drawings. Also there could be additional separation gap locales 48. Other embodiments could have four or more bolt and nut fasteners 16, depending on the length of the specified completely fabricated pipe sleeve 10.

In respect to sealing members, such as the gasket 37 illustrated as being in two parts, i.e. the larger portion 38 and the smaller portion 40, other gaskets are also used. In FIGS. 2 and 6, the smaller gasket portion 40, for better illustration purposes is shown located above the larger gasket portion 38, where it would be effective. Preferably, however, the smaller gasket portion 40, is located below the larger gasket portion 38. In this lower position it is secured in position on the interior surface of the pipe sleeve 10 using a bonding agent. The fabricated side bars with their respective lugs are used with sleeves, which utilize only gaskets located around the necks of the sleeves.

These completely fabricated pipe sleeves 10 are available of mild steel with an epoxy or painted coating, of bronze, of other special alloys, and of stainless steels. No casting methods are used. Fabricating by cutting, bending, punching and welding is undertaken.

The Advantages Realized When Sleeve Assemblies are Completely Fabricated

Previously castings have been utilized to provide the features of the side bars with lugs, and these lugs have received the bolts at their head portion in a drop in motion sequence, after the end of the bolt has been entered through a hole in an opposite lug. Also the lugs, in part, previously have extended over the opposite side bar, so upon tightening the bolt and fasteners, the bolts are not subjected to unwanted bending stresses, and also tendencies to distort the pipe are reduced. Preferably, no distortion of the circular cross-sectional area at any longitudinal location along a plastic pipe is wanted. If this distortion occurs, the distortion indicates the plastic pipe is being unwantedly stressed, and this stressing may be exceeding an acceptable limit of stress.

However, by fabricating the metal parts of pipe sleeves: comparatively lower costs are realized; the higher costs involved, for example, in casting the extended leg portions of the lugs are avoided; there is a more timely utilization of many different available metals and metal alloys; there is a better production availability of long lengths of the welded together side bars and lugs of both designs, in their respective sizes, which are cut to selected lengths; and there is the opportunity of providing stronger pipe sleeves in many sizes, which upon their securement cause no distortion of plastic pipes, or cause limited distortion of plastic pipes within acceptable limits.

We claim:

1. A completely fabricated pipe sleeve assembly, adapted to receive gasket material, having bolt and nut fasteners, which are independently removable, and this assembly is ready for pipe repair, when a selected gasket material is added, and also this assembly is ready for additional fabrication and assembly to make another overall product, to be used, with respect to both metal and plastic pipes, without any substantial distortion of plastic pipes, comprising:
   a. a split sleeve adapted to be fitted about a pipe and configured to be in one or more pieces;
   b. at least two side bar and lug units welded to the split sleeve in opposing positions to receive at least two independently removable bolt and nut fasteners; wherein the side bar and and lug units, in turn comprise:
      two identical units of a bar, each bar having at least two spaced identical lugs, and each lug having a hole to receive a portion of a bolt; and
      one of the two identical units is assembled end for end opposite the other unit, and both units are welded to the split sleeve along opposite sides of the separation gap of the split sleeve, and
   c. at least two independently removable bolt and nut fasteners.

2. A completely fabricated pipe sleeve assembly, as claimed in claim 1, wherein all the at least two side bar and lug units are first fabricated as extended bars, each having multiple spaced lugs, and then, upon the preassembly decision as to the specified length of the bar on which a specific number of lugs are welded, the extended bar is transversely cut to the specified lengths.

3. A completely fabricated pipe sleeve assembly, inclusive of a shell gasket, having bolt and nut fasteners, which are independently removable, and this assembly is ready for pipe repair, and also this assembly is ready for additional fabrication and assembly to make, another overall product to be used with respect to both metal and plastic pipes, without an substantial distortion of plastic pipes, comprising:
   a. a split sleeve adapted to be fitted about a pipe and configured to be in one or more pieces;

b. at least two side bar and lug units welded to the split sleeve in opposing positions to receive at least two independently removable bolt and nut fasteners wherein the side bar and lug units, in turn comprise:

two identical units of a bar, each bar having at least two spaced identical lugs, and each lug having a hole to receive a portion of a bolt; and one of the two identical units is assembled end for end opposite the other unit, and both units are welded to the split sleeve along opposite sides of the separating gap of the split sleeve, c. at least two independently removable bolt and nut fasteners; and d. a shell gasket to be positioned along a pipe and within the split sleeve.

4. A completely fabricated pipe sleeve assembly, as claimed in claim 2, wherein all the at least two side bar and lug units are first fabricated as extended bars, each having multiple spaced lugs, and then, upon the preassembly decision as to the specified length of the bar on which a specific number of lugs are welded, the extended bar is transversely cut to the specified lengths.

5. A completely fabricated pipe sleeve assembly, adapted to receive gasket material, having bolt and nut fasteners, which are independently removable, and this assembly is ready for pipe repair, when a selected gasket material is added, and also this assembly is ready for additional fabrication and assembly to make another overall product to be used with respect to both metal and plastic pipes, without any substantial distortion of plastic pipes, comprising:

a. split sleeve adapted to be fitted about a pipe and configured to be in one or more pieces;

b. at least two side bar and lug units welded to the split sleeve in opposing positions to receive at least two independently removable bolt and nut fasteners; wherein the side bar and lug units, in turn comprise:

two identical units of a bar;

each bar having at least two spaced identical lugs;

each lug having a hole to receive a portion of a bolt;

each lug having an integral transverse extended portion to extend across the separating gap of the split sleeve and over the bar of the oppositely located side bar and lug unit;

each lug having an integral longitudinal portion extending at near right angles to the transverse extended portion and extending along the side bar, to provide a portion through which the hole is made to receive a portion of a bolt, and c. at least two independently removable bolt and nut fasteners.

6. A completely fabricated pipe sleeve assembly, as claimed in claim 5, wherein the integral longitudinal portion continues on beyond the portion having the hole to receive a portion of a bolt, and then has an integral transverse extended portion extending partially over the side bar, to thereby increase the strength of the lug.

7. A completely fabricated pipe sleeve assembly, as claimed in claim 6, wherein the integral transverse extended portion which, upon assembly, extends across the separating gap of the split sleeve, has a guiding surface structure for conveniently passing this integral transverse extended portion over the bar of the oppositely located side bar and lug unit.

8. A completely fabricated pipe sleeve assembly, as claimed in claim 5, wherein the integral transverse extended portion which, upon assembly, extends across the separating gap of the split sleeve, has a guiding surface structure for conveniently passing this integral transverse extended portion over the bar of the oppositely located side bar and lug unit.

9. A completely fabricated pipe sleeve assembly, inclusive of a shell gasket, having bolt and nut fasteners which are independently removable, and this assembly is ready for pipe repair, and also this assembly is ready for additional fabrication and assembly to make another overall product to be used with respect to both metal and plastic pipes, without any substantial distortion of plastic pipes, comprising:

a. a split sleeve adapted to be fitted about a pipe and configured to be in one or more pieces;

b. at least two side bar and lug units welded to the split sleeve in opposing positions to receive at least two independently removable bolt and nut fasteners; wherein the side bar and lug units, in turn comprise:

two identical units of a bar;

each bar having at least two spaced identical lugs;

each lug having a hole to receive a portion of a bolt;

each lug having an integral transverse extended portion to extend across the separating gap of the split sleeve and over the bar of the oppositely located side bar and lug unit;

each lug having an integral longitudinal portion extending at near right angles to the transverse extended portion and extending along the side bar, to provide a portion through which the hole is made to receive a portion of a bolt;

c. at least two independently removable bolt and nut fasteners; and d. a shell gasket to be positioned along a pipe and within the split sleeve.

10. A completely fabricated pipe sleeve assembly, as claimed in claim 9, wherein the integral longitudinal portion continues on beyond the portion having the hole to receive a portion of a bolt, and then has an integral transverse extended portion extending partially over the side bar, to thereby increase the strength of the lug.

11. A completely fabricated pipe sleeve assembly, adapted to receive gasket material, having bolt and nut fasteners, which are independently removable, and this assembly is ready for pipe repair, when a selected gasket material is added, and also this assembly is ready for additional fabrication and assembly to make another overall product to be used with respect to both metal and plastic pipes, without any substantial distortion of plastic pipes, comprising:

a. a split sleeve adapted to be fitted about a pipe and configured to be in one or more pieces;

b. at least two side bar and lug units welded to the split sleeve in opposing positions to receive at least two independently removable bolt and nut fasteners; wherein the side bar and lug units, in turn comprise:

one side bar and lug unit having at least two spaced identical lugs;

each lug having a hole to receive a portion of a bolt;

each lug having an integral transverse extended portion to extend across the split of the split sleeve and over the bar of the oppositely located side bar and lug unit;

each lug having an integral longitudinal portion extending at near right angles to the transverse extended portion and extending along the side bar, to provide a portion through which the hole is made to receive a portion of a bolt; and the other side bar and lug unit having at least two spaced identical two piece lugs, with these two pieces being spaced to closely hold a portion of a bolt adjacent the head thereof, after a portion of a bolt is dropped into place between the two pieces of the lug, and each pipe of the lug has an overhanging lip to hold the bolt head in place, and one of these two pieces of the lug is longer than the other piece and thereby extends transversely to extend across the split of the split sleeve and over the side bar of the oppositely located side bar and lug unit, and c. at least two independently removable bolt and nut fasteners.

12. A completely fabricated pipe sleeve assembly, as claimed in claim 11, wherein the integral longitudinal portion continues on beyond the portion having the hole to receive a portion of a bolt, and then has an integral transverse extended portion extending partially over the side bar, to thereby increase the strength of the lug.

13. A completely fabricated pipe sleeve assembly as claimed in claim 12, wherein the piece of the lug which is longer, is bent outwardly beyond where the bolt portion is closely held, to thereby clear transverse extended portion, having the hole to receive the bolt, of the oppositely positioned side bar and lug unit, when a final in the field assembly is completed.

14. A completely fabricated pipe sleeve assembly, inclusive of a shell gasket, having a bolt and nut fasteners which are independently removable, and this assembly is ready for pipe repair, and also this assembly is ready for additional fabrication and assembly to make another overall product to be used with respect to both metal and plastic pipes, without any substantial distortion of plastic pipes, comprising:

a. a split sleeve adapted to be fitted about a pipe and configured to be in one or more pieces;

b. at least two side bar and lug units welded to the split sleeve in opposing positions to receive at least two independently removable bolt and nut fasteners; wherein the side bar and lug units, in turn comprise:

one side bar and lug unit having at least two spaced identical lugs;

each lug having a hole to receive a portion of a bolt;

each lug having an integral transverse extended portion to extend across the split of the split sleeve and over the bar of the oppositely located side bar and lug unit;

each lug having an integral longitudinal portion extending at near right angles to the transverse extended portion and extending along the side bar, to provide a portion through which the hole is made to receive a portion of a bolt; and the other side bar and lug unit having at least two spaced identical two piece lugs, with these two pieces being spaced to closely hold a portion of a bolt adjacent the head thereof, after a portion of a bolt is dropped into place between the two pieces of the lug, and each piece of the lug has an overlapping lip to hold the bolt head in place, and one of these two pieces of the lug is longer than the other piece and thereby extends transversely to extend across the split of the split sleeve and over the side bar of the oppositely located side bar and lug unit;

c. at least two independently removable bolt and nut fasteners; and d. a shell gasket to be positioned along a pipe and within the split sleeve.

15. A completely fabricated pipe sleeve assembly, as claimed in claim 14, wherein the integral longitudinal portion continues on beyond the portion having the hole to receive a portion of a bolt, and then has an integral transverse extended portion extending partially over the side bar, to thereby increase the strength of the lug.

16. A completely fabricated pipe sleeve assembly as claimed in claim 15, wherein the piece of the lug which is longer, is bent outwardly beyond where the bolt portion is closely held, to thereby clear the transverse extended portion, having the hole to receive the bolt, of the oppositely positioned side bar and lug unit, when a final in the field assembly is completed.

* * * * *